(12) United States Patent
Sadjadian

(10) Patent No.: US 6,181,831 B1
(45) Date of Patent: *Jan. 30, 2001

(54) SPATIAL FREQUENCY-DOMAIN VIDEO SIGNAL PROCESSING

(75) Inventor: Ahmad Sadjadian, Swindon (GB)

(73) Assignees: Sony Corporation, Tokyo (JP); Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/721,622

(22) Filed: Sep. 26, 1996

(30) Foreign Application Priority Data

Sep. 28, 1995 (GB) .................................. 9519795

(51) Int. Cl.[7] ....................................... G06K 9/36
(52) U.S. Cl. .................. 382/276; 382/232; 382/248; 382/250; 382/284; 382/302; 345/517; 364/725.03; 364/736.01; 364/736.03
(58) Field of Search ........................ 382/232, 248, 382/250, 358, 364, 348, 154, 284, 294, 302; 345/517; 364/725.03, 736.01, 736.03

(56) References Cited

U.S. PATENT DOCUMENTS

| | | | |
|---|---|---|---|
| 3,905,018 | * 9/1975 | Gary | 340/146.3 |
| 4,134,134 | * 1/1979 | Lux | 382/281 |
| 4,163,258 | * 7/1979 | Ebihara et al. | 382/264 |
| 4,245,248 | * 1/1981 | Netravali et al. | 358/133 |
| 4,442,454 | * 4/1984 | Powell | 358/167 |
| 4,447,886 | * 5/1984 | Meeker | 364/723 |
| 4,751,742 | * 6/1988 | Meeker | 382/41 |
| 4,754,492 | * 6/1988 | Malvar | 382/41 |
| 5,170,264 | * 12/1992 | Saito et al. | 358/433 |
| 5,301,242 | * 4/1994 | Gonzales et al. | 382/56 |
| 5,325,215 | * 6/1994 | Shibata et al. | 358/426 |
| 5,414,780 | * 5/1995 | Carnaham | 382/41 |
| 5,428,693 | * 6/1995 | Murakami et al. | 382/56 |
| 5,642,438 | * 6/1997 | Babkin | 382/250 |
| 5,663,763 | * 9/1997 | Yagasaki et al. | 348/405 |

* cited by examiner

*Primary Examiner*—Matthew C. Bella
*Assistant Examiner*—Sheela Chawan
(74) *Attorney, Agent, or Firm*—Frommer Lawrence & Haug, LLP.; William S. Frommer; Joe Shallenburger

(57) ABSTRACT

A method of generating an output array of image spatial frequency coefficients from input arrays of image spatial frequency coefficients overlapped by the required array, the spatial frequency coefficients being transformable to image pixel values by a predetermined spatial frequency transformation, comprises the steps of: matrix-multiplying each input array by one or more respective matrices having coefficients derivable by applying the inverse of the predetermined spatial frequency transformation to respective translation matrices which, if matrix-multiplied by that input array, would provide a translation of the overlapped portion of that input array to an overlapping position in the output array; and matrix-adding the respective matrix products generated from each overlapped input array.

5 Claims, 6 Drawing Sheets

SPATIAL FREQUENCY-DOMAIN VIDEO SIGNAL PROCESSING

BACKGROUND OF THE INVENTION

1. Field of the Invention

This invention relates to frequency-domain signal processing, and particularly to video signal processing in the spatial frequency domain.

2. Description of the Prior Art

Motion estimation is used in many video signal processing schemes, and in particular video compression schemes, in order to reduce the amount of data which has to be transmitted or stored to represent a series of images (e.g. fields or frames). This benefit can be achieved because there is often a great deal of redundancy present in a video sequence. In particular, many areas of an image stay the same or are simply displaced from image to image. Thus, a reasonably good replica of a frame can be constructed from appropriately selected areas of previous frame(s), referred to here as reference frames.

For this type of processing, frames are generally broken down into square or rectangular areas (arrays of pixels) known as macroblocks. For example, in one previously proposed system, a macroblock comprises an array of 16×16 pixels. For each macroblock, one or more motion vectors is computed and transmitted or stored. The motion vectors point to areas on previous frame(s) which most closely resemble the content of the macroblock.

At the decoder, the motion vectors, together with error data (representing the difference between the actual or original frame and a replica predicted from the reference frame(s) using the motion vectors) are used to reconstruct each frame.

The process of computing the motion vectors at the encoder is generally referred to as motion estimation, and the process of generating the replica or reconstructed frames is generally referred to as motion compensation.

Many video compression schemes which use motion-based processing also try to reduce further the redundancy present in the video data, by first transforming the spatial domain data into a corresponding set of frequency domain coefficients which represent different spatial frequency components of the video data, and then reducing the amount of information by quantising these coefficients. A common technique for transforming the data to and from the frequency domain is the discrete cosine transform (DCT).

The discrete cosine transform is a block-based, process, so that an array of DCT coefficients is generated from each macroblock, independently of other macroblocks in the image. Usually, the array of coefficients (referred to here as a DCT block) is the same size (i.e. the same number of elements) as the original macroblock.

Therefore, if there is a need to generate a block of DCT coefficients based on a different block structure, it is necessary to decode the DCT data back to spatial (pixel) data and then recode in accordance with the required block structure. This can be processor-intensive and time-consuming.

SUMMARY OF THE INVENTION

This invention provides a method of generating an output array of image spatial frequency coefficients from input arrays of image spatial frequency coefficients overlapped by the required array, the spatial frequency coefficients being transformable to image pixel values by a predetermined spatial frequency transformation, the method comprising the steps of:

matrix-multiplying each input array by one or more respective matrices having coefficients derivable by applying the inverse of the predetermined spatial frequency transformation to respective translation matrices which, if matrix-multiplied by that input array, would provide a translation of the overlapped portion of that input array to an overlapping position in the output array; and matrix-adding the respective matrix products generated from each overlapped input array.

The invention involves a recognition of the counter-intuitive feature of spatial frequency coefficients such as DCT coefficients, that a required array overlapping a number of input arrays of coefficients can be generated simply by matrix-multiplying each input array which is overlapped by an array position in the output array by suitable pre- and post-matrices.

This now means that motion compensation can be performed in the DCT domain. This is potentially very useful in applications such as, for example, converting one GOP format into another GOP format.

Preferably the predetermined spatial frequency transformation is the inverse discrete cosine transform.

For use in motion compensation techniques, it, is preferred that the method comprises the step of detecting portions of the input arrays overlapped by the output array in response to a motion vector associated with the output array.

Preferably the one or more matrices comprise a pre-multiplying matrix and a post-multiplying matrix.

The invention also provides video signal processing apparatus for generating an output array of image spatial frequency coefficients from input arrays of image spatial frequency coefficients overlapped by the required array, the spatial frequency coefficients being transformable to image pixel values by a predetermined spatial frequency transformation, the apparatus comprising:

means for matrix-multiplying each input array by one or more respective matrices having coefficients derivable by applying the inverse of the predetermined spatial frequency transformation to respective translation matrices which, if matrix-multiplied by that input array, would provide a translation of the overlapped portion of that input array to an overlapping position in the output array; and means for matrix-adding the respective matrix products generated from each overlapped input array.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
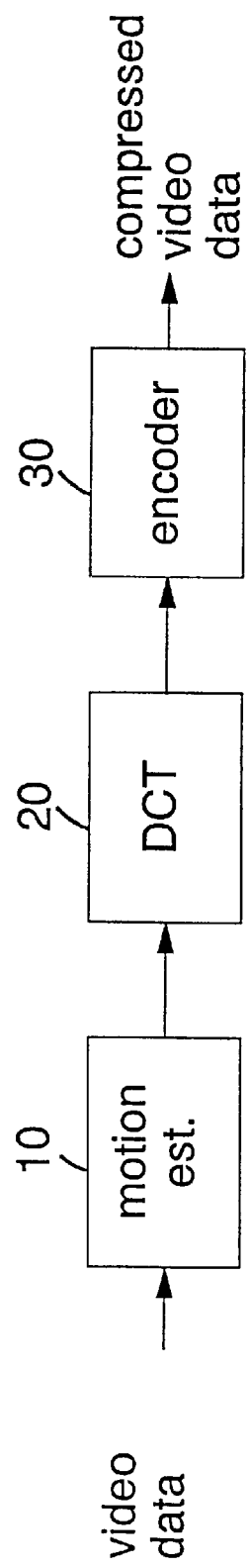
FIG. 1 is a schematic diagram of a previously proposed video data compression apparatus.

FIG. 1 is a schematic diagram of a previously proposed video data compression apparatus. In FIG. 1, input (uncompressed) video data is supplied first to a motion estimator 10 which generates motion vectors for each macro block of a current field or frame indicating portions of a preceding and/or following field or frame which most closely resemble that macro block.

The differences between the current macro block and the portion of the reference field or frame(s) pointed to by the motion vectors are then encoded by the Discrete Cosine Transform (DCT) in a DCT encoder 20. The DCT encoder 20 generates an array or block of DCT coefficients from the difference data associated with each macro block.

Finally, the blocks of DCT coefficients are supplied to an encoder 30 which quantises the DCT coefficients and then forms run-length and entropy (eg Huffman) coding to generate a data stream of compressed video data.

Figure 2:
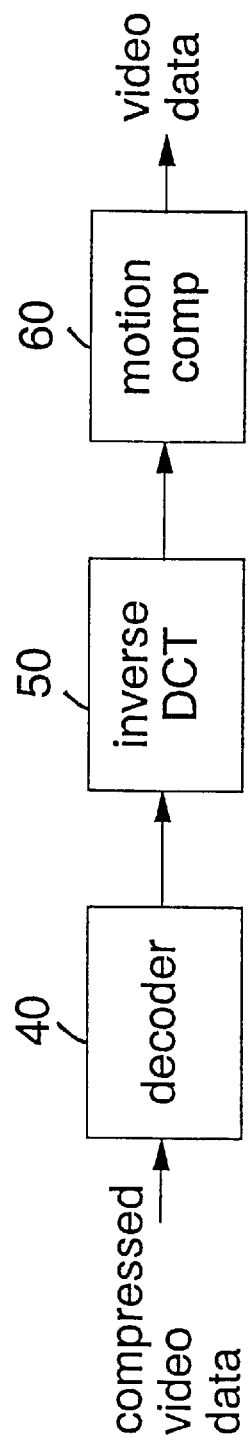
FIG. 2 is a schematic diagram of a complementary previously proposed video data decompression apparatus.

FIG. 2 is a schematic diagram of a complementary previously proposed video data decompression apparatus which is operable to decompress the compressed video data output by the apparatus of FIG. 1.

In FIG. 2, the compressed video data is supplied first to a decoder 40 which operates in a complementary manner to the encoder 30 of FIG. 1. Therefore, in particular, the decoder 40 performs inverse entropy coding, inverse run-length coding and inverse quantisation to generate blocks of DCT coefficients at its output.

These blocks of DCT coefficients are supplied to an inverse DCT coder 50 which transforms the DCT coefficients into spatial video information. The output of the inverse DCT coder 50 represents the differences between the current macro block and a block of pixels of a reference frame or frames pointed to by motion vectors associated with the macro block. Therefore, a stage of motion compensation 60 is required to obtain the block or blocks pointed to by the motion vectors and combine them with the difference data to generate output video data.

Figure 3B:
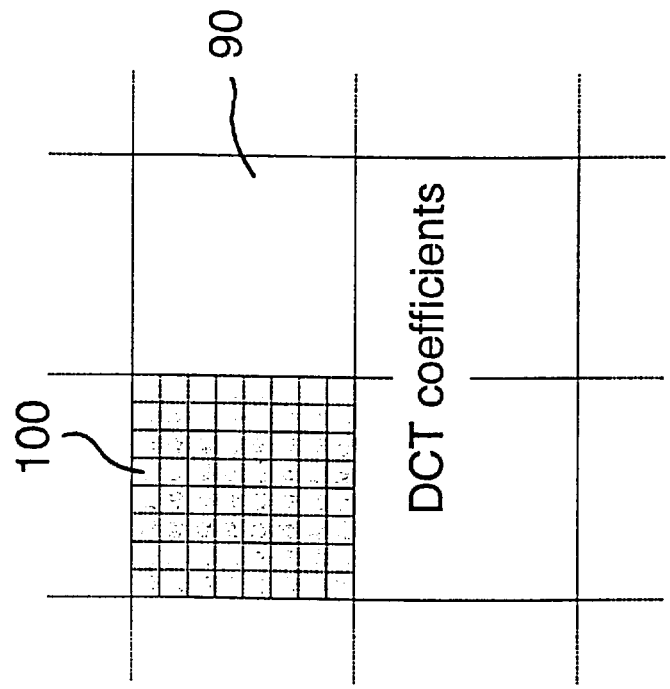
FIGS. 3a and 3b schematically illustrate the generation of discrete cosine transform (DCT) coefficients from video data representing a block of pixels.
Figure 3A:
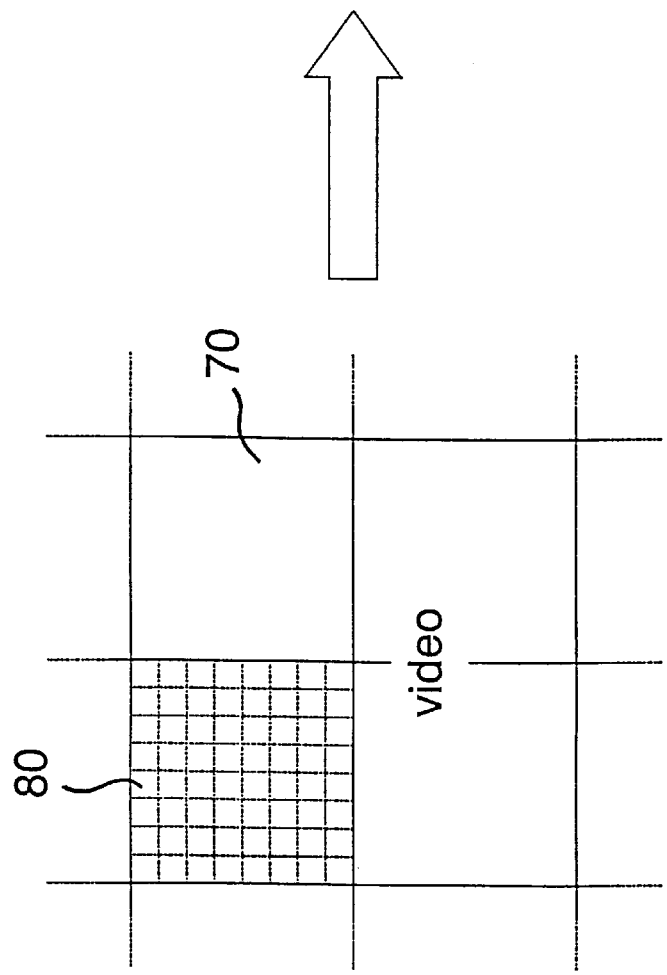

FIGS. 3a and 3b schematically illustrate the generation of discrete cosine transform (DCT) coefficients from video data representing a block of pixels. In particular, FIG. 3a shows a part of an image divided up into blocks 70 of 8×8 pixels 80. (In other embodiments, different block sizes could of course be used).

The DCT process is well described elsewhere, and leads to blocks 90 of 8×8 DCT coefficients 100 being generated (FIG. 3b). Importantly, each block 90 of DCT coefficients represents the spatial frequency content of a corresponding respective block 70 of the original image. In other words, there is a one-to-one mapping between image blocks 70 and DCT blocks 90. The DCT process is self-contained with respect to the block structure, so that the coefficients of a particular DCT block 90 are unaffected by pixels in blocks 70 of the input image other than the particular block 70 corresponding to that block 90 of coefficients.

Figure 4:
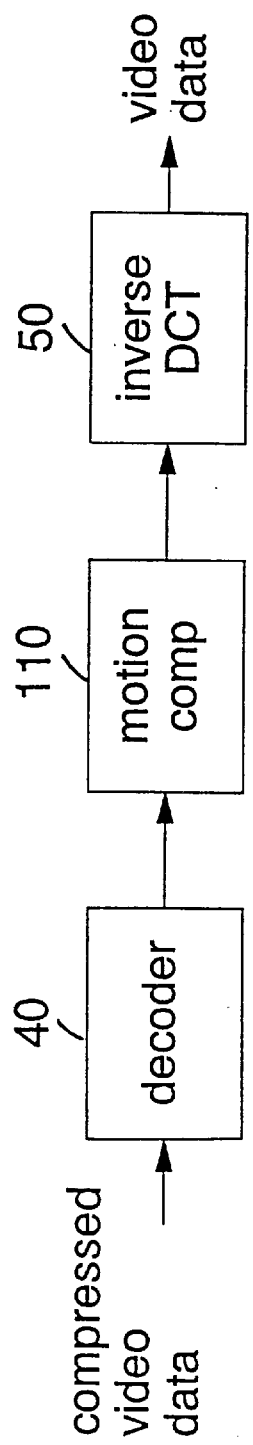
FIG. 4 is a schematic diagram of a video data decompression apparatus according to an embodiment of the invention.

FIG. 4 is a schematic diagram of a video data decompression apparatus according to an embodiment of the present invention. In fact, FIG. 4 shows just one application of the present technique, to illustrate the principles involved. Other applications of these techniques will be described below.

Referring to FIG. 4, compressed video data is supplied first to a decoder 40 (which may be identical to that used in FIG. 2) which operates in a complementary manner to the encoder 30 of FIG. 1. As described above, therefore, the decoder 40 performs inverse entropy coding, inverse-length coding and inverse quantisation to generate blocks of DCT coefficients at its output.

However, in contrast to the apparatus of FIG. 2, the blocks of DCT coefficients are supplied to a motion compensator 110 which performs motion compensation on the DCT data, using techniques to be described below.

Finally, the motion-compensated DCT data is supplied to an inverse DCT coder 50, which may be similar or identical to the inverse DCT coder of FIG. 2.

The aim of the new technique of motion compensation in the DCT (spatial frequency) domain is to use the DCT data output by the decoder 40 and the motion vectors originally generated by the motion estimator 10 in FIG. 1 to generate—for every 8×8 macro block of the eventual image—the block of 64 DCT coefficients which in the spatial frequency domain best represents that macro block. Since a motion vector is supplied for each macro block of the eventual output image, it is therefore necessary to project a set of DCT coefficients from a position in the DCT domain pointed to by the motion vector into each macro block for the required output image.

Figure 5A:
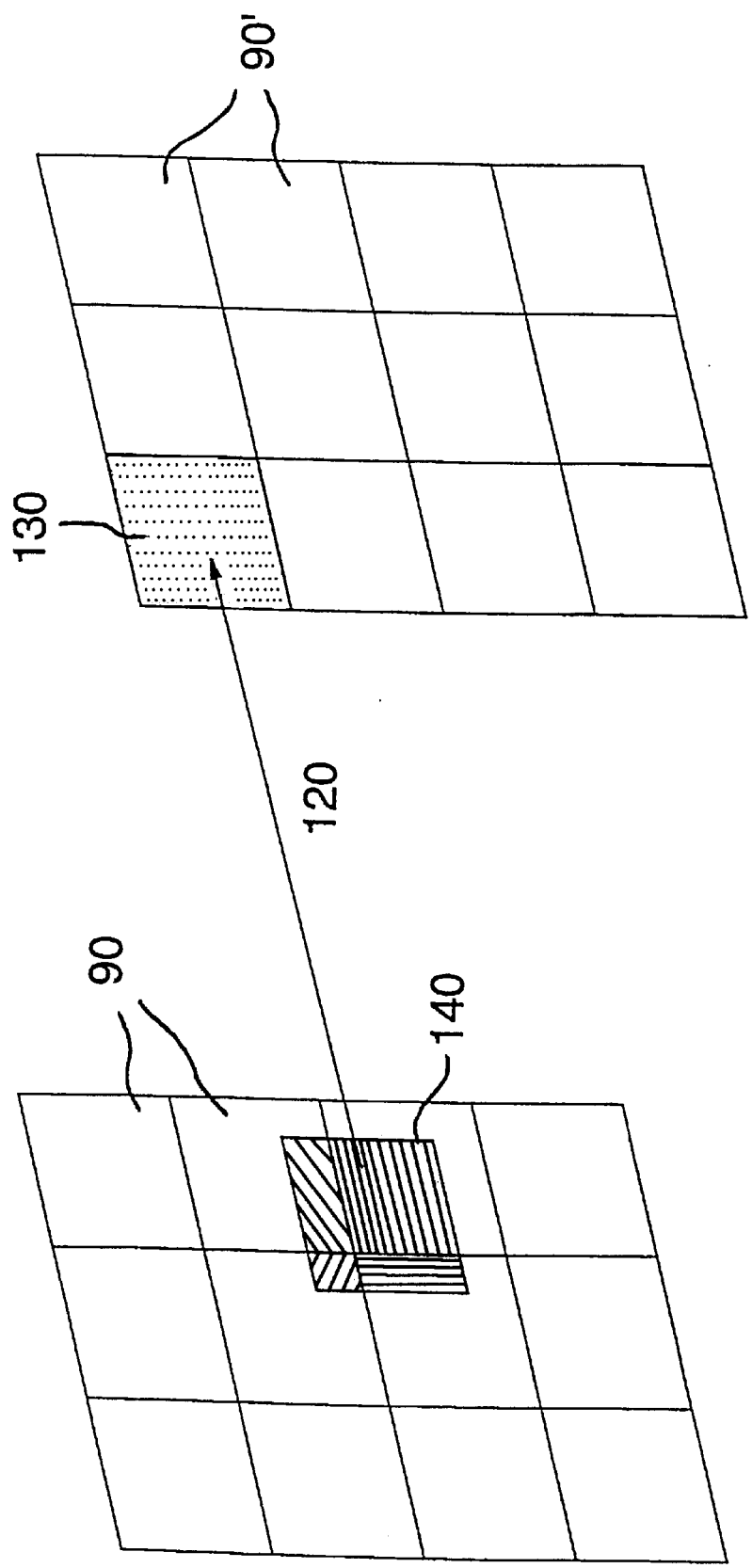
FIG. 5a schematically illustrates the operation of motion compensation in the DCT domain.

This process is illustrated schematically in FIG. 5a. At the left-hand side of FIG. 5a an array of blocks 90 of DCT data output by the decoder 40 is illustrated. At the right-hand side of FIG. 5a, an array of blocks 90' of DCT data to be supplied to the inverse DCT coder 50 is illustrated.

For each block 90' of the required DCT data, there is an associated motion vector 120. (In fact, strictly speaking, the motion vectors are associated with blocks of pixels, but it has already been noted that there is a one-to-one correspondence between pixel blocks 70 and DCT blocks 90 (90')).

An area 140 illustrates the notional position of the required DCT block 130, as projected back into the available blocks of DCT data 90. It will be seen that the notional position 140 in fact overlaps four of the DCT blocks output by the decoder 40. A technique will be described below in which the required block 130 can be generated from the four existing overlapped blocks of DCT data. In fact, for each particular required block of DCT data, the coefficients of that required block 130 are generated from of the array of DCT blocks 90 output by the decoder 40, which is pointed to by tracing back along the respective motion vector 120 associated with the required block 130.

If the motion vectors always had motion components in the horizontal and vertical directions of multiples of 8 pixels, this motion compensation process would be extremely simple since one of the DCT blocks 90 would map directly on to the required block 130. However, in practice motion vectors can take any value (or at least more possible values than merely multiples of 8 pixels) and so in general the notional area 140 will overlap at least two, and usually four, DCT blocks 90. Further processing is therefore required to map the coefficients on to the required block 130.

Figure 5B:
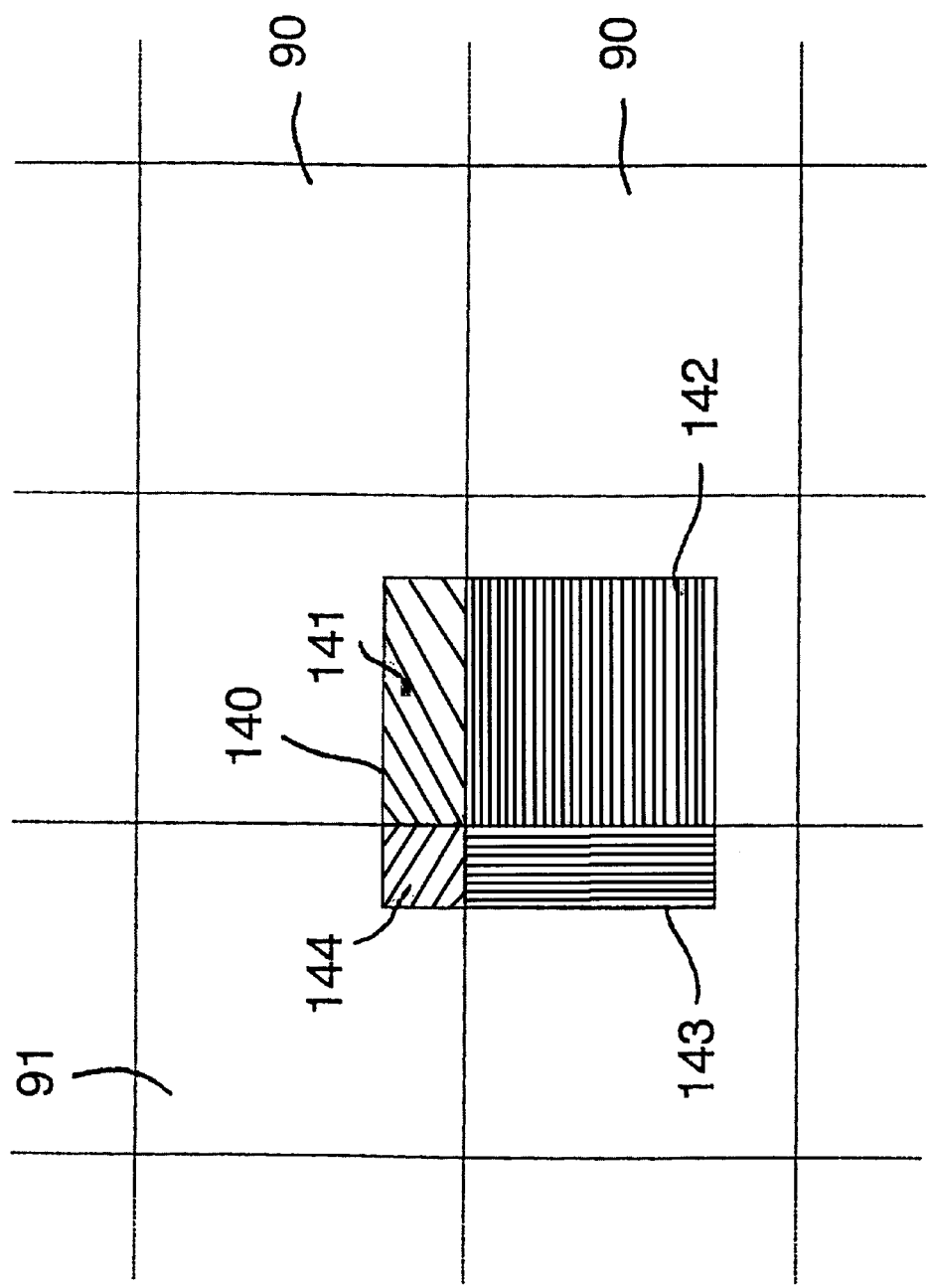
FIG. 5b schematically illustrates a desired DCT block overlying four existing DCT blocks.
Figure 6B:
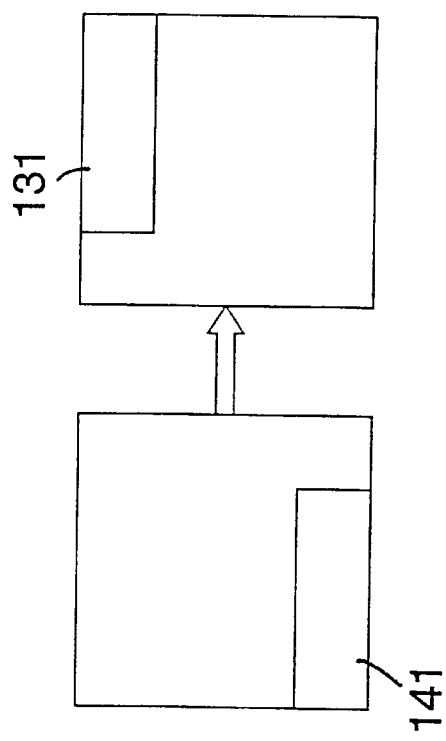
FIGS. 6a to 6d schematically illustrate the generation of the desired DCT block from the four existing blocks.
Figure 6D:
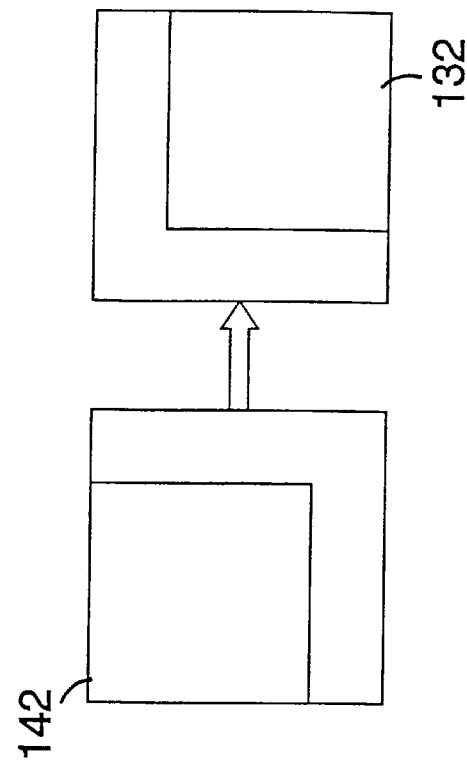
Figure 6A:
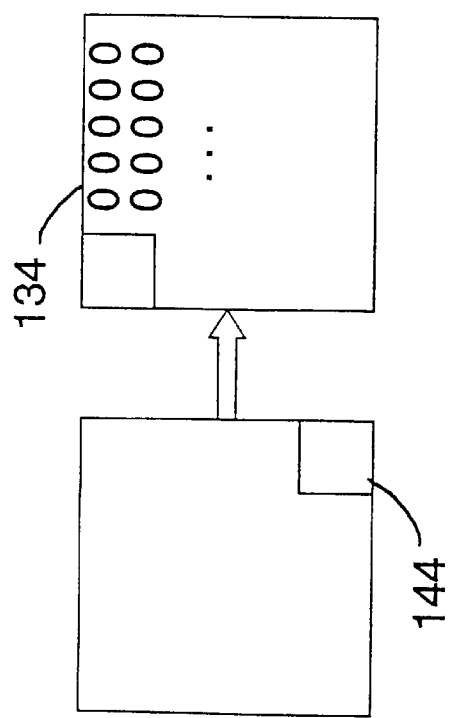
Figure 6C:
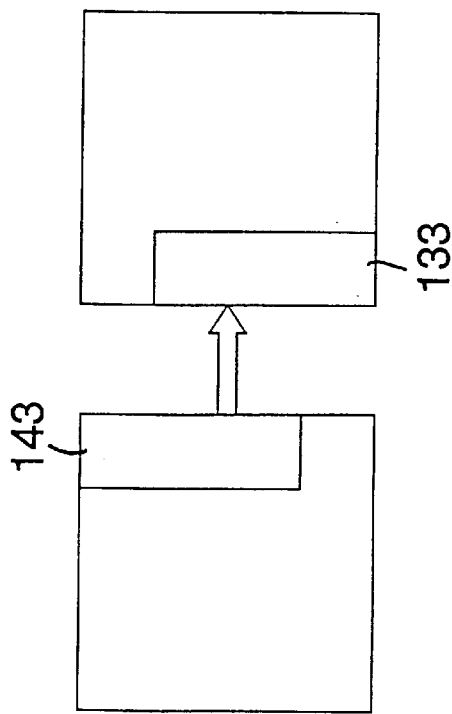

FIG. 5b is an enlarged view of the area 140 of the left-hand side of FIG. 5a.

It will be seen that the area 140 in fact overlaps four of the DCT blocks 90. In particular, the area 140 can be considered as four sub-areas 141, 142, 143 and 144 overlapping respective individual DCT blocks 90.

A technique is therefore required that can compute the 64 DCT coefficients of the desired block 130 from the DCT coefficients of the four sub-areas 141 . . . 144, without resorting to the complex and processor-intensive solution of transforming the four overlapped blocks 90 back into the pixel domain and then recoding the area 140.

Given that the DCT process is block-based, with a one-to-one correspondence between blocks of pixels and corresponding blocks of DCT coefficients, the following observations are made:

(i) each of the four overlapped DCT blocks of FIG. 5b corresponds to a respective block of pixels in the pixel domain; and (ii) the required DCT block in fact represents a DCT transformation of a composite block of pixels made up of pixels in positions corresponding to the four sub-areas 141 . . . 144.

Showing this in an illustrative matrix form, and using the distributive property of the DCT process, $$DCT\left[\binom{\text{desired } 8 \times 8}{\text{block } 140}\right] = DCT\begin{bmatrix} x & x & 0 & 0 & 0 & 0 & 0 & 0 \\ x & x & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} + DCT\begin{bmatrix} 0 & 0 & x & x & x & x & x & x \\ 0 & 0 & x & x & x & x & x & x \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} + DCT\begin{bmatrix} 0 & 0 & 0 & 0 & 0 & 0 & 0 & 0 \\ 0 & 0 & 0 & 0 & 0 & 0 & 0 & 0 \\ x & x & 0 & 0 & 0 & 0 & 0 & 0 \\ x & x & 0 & 0 & 0 & 0 & 0 & 0 \\ x & x & 0 & 0 & 0 & 0 & 0 & 0 \\ x & x & 0 & 0 & 0 & 0 & 0 & 0 \\ x & x & 0 & 0 & 0 & 0 & 0 & 0 \\ x & x & 0 & 0 & 0 & 0 & 0 & 0 \end{bmatrix} + DCT\begin{bmatrix} 0 & 0 & 0 & 0 & 0 & 0 & 0 & 0 \\ 0 & 0 & 0 & 0 & 0 & 0 & 0 & 0 \\ 0 & 0 & x & x & x & x & x & x \\ 0 & 0 & x & x & x & x & x & x \\ 0 & 0 & x & x & x & x & x & x \\ 0 & 0 & x & x & x & x & x & x \\ 0 & 0 & x & x & x & x & x & x \\ 0 & 0 & x & x & x & x & x & x \end{bmatrix}$$

where an 'x' in each matrix on the right hand-side of this equation indicates a pixel value from a pixel sub-area corresponding to the sub-areas 141 . . . 144 (as translated to the required position in the required DCT array), and a '0' simply represents a zero value.

Each of the four matrices on the right hand side of the above equation can actually be generated from the respective full block of pixels by pre- and post-multiplication by suitable pre- and post-matrices. In other words, in the pixel domain, an example required matrix R can be generated as follows:

$$\begin{pmatrix} 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \end{pmatrix} \text{(pre-matrix)} \cdot$$

$$(R) = \begin{pmatrix} 0 & 0 & 0 & 0 & 0 & 0 & 0 & 0 \\ 0 & 0 & 0 & 0 & 0 & 0 & 0 & 0 \\ 0 & 0 & x & x & x & x & x & x \\ 0 & 0 & x & x & x & x & x & x \\ 0 & 0 & x & x & x & x & x & x \\ 0 & 0 & x & x & x & x & x & x \\ 0 & 0 & x & x & x & x & x & x \\ 0 & 0 & x & x & x & x & x & x \end{pmatrix} \begin{pmatrix} y & y & y & y & y & y & y & y \\ y & y & y & y & y & y & y & y \\ y & y & y & y & y & y & y & y \\ y & y & y & y & y & y & y & y \\ y & y & y & y & y & y & y & y \\ y & y & y & y & y & y & y & y \\ y & y & y & y & y & y & y & y \\ y & y & y & y & y & y & y & y \end{pmatrix} \text{(video matrix)} \cdot$$

$$\begin{pmatrix} 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{pmatrix} \text{(post-matrix)}$$

where the dot represents a matrix multiplication process and a 'y' represents a pixel value.

Applying the DCT process to both sides of this equation, each of the four DCT matrices on the right hand side of the first equation above can be written as a product of three matrices:

DCT [R]=DCT [(pre-matrix)·(video matrix)·(post-matrix)]

As all non-zero elements of the pre-and post-matrices in this embodiment form identity sub-matrices (see below), this in fact can be re-written in a different form:

DCT [R]=DCT [(pre-matrix)]·DCT [(video matrix)]·DCT [(post-matrix)]

However, DCT [(video matrix)] is simply the block of DCT coefficients overlapped by the required sub-area 141 . . . 144.

This therefore shows that the DCT coefficients for the block R, i.e. DCT [R]. can be obtained by pre- and post-multiplication of each overlapped existing DCT block 90 by suitable frequency domain pre- and post-matrices. These frequency domain pre- and post-matrices are obtained by applying the DCT transform to pixel domain pre- and post-matrices which give block translations, as described below.

The derivation of the pixel domain pre- and post-matrices is described in Appendix 1; the frequency-domain matrices are then obtained by applying the DCT process to the pixel domain matrices.

FIGS. 6a to 6d schematically summarise the effect of the pixel domain translation pre- and post-matrices to translate portions 141 . . . 144 of four blocks of pixels to respective portions 131 . . . 134.

It will be appreciated that the known rules of matrix multiplication (e.g. associativity for square matrices) can be applied to vary the order of the multiplication steps described here. The particular described arrangement of pre- and post-matrices is by way of example only.

Figure 7:
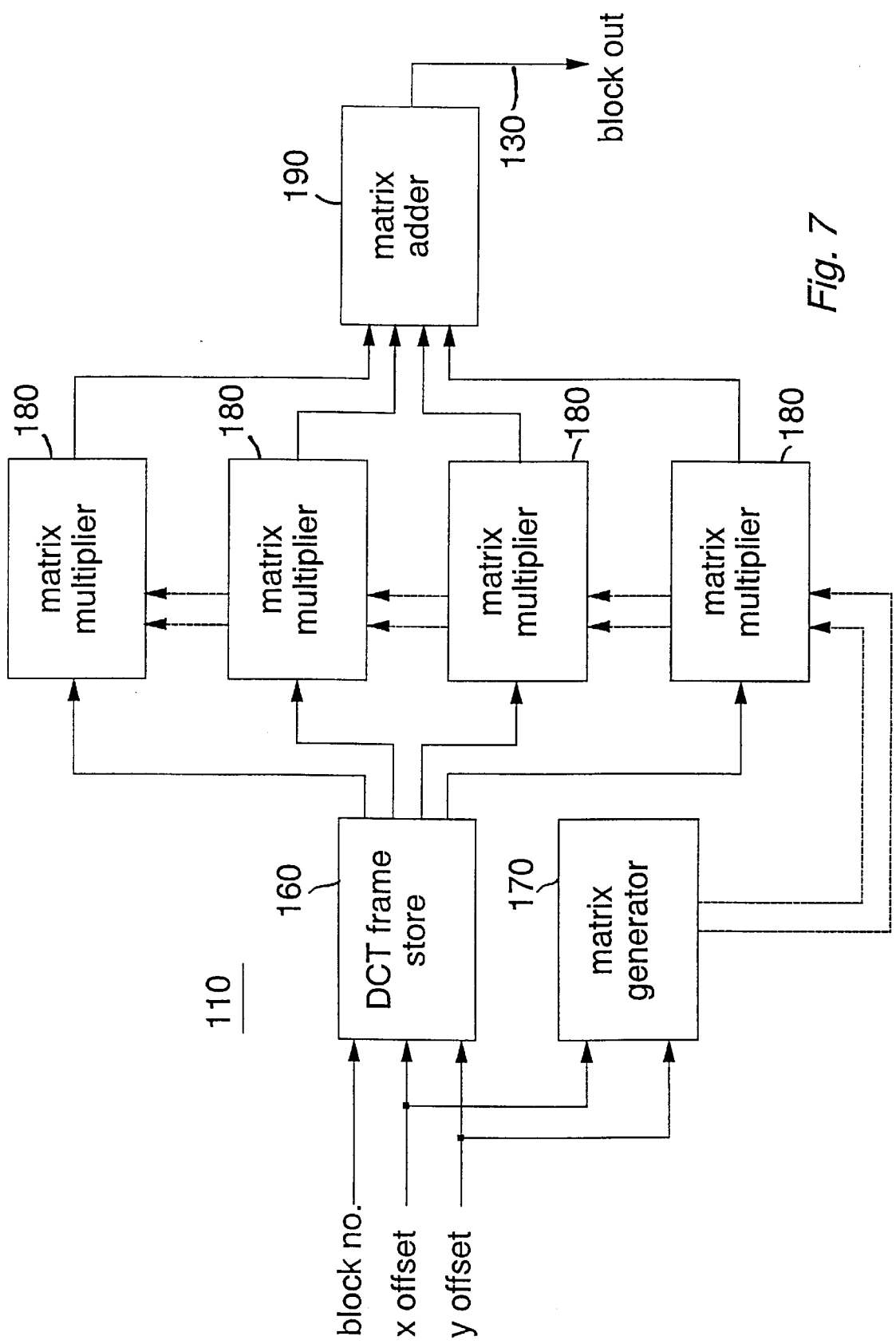
FIG. 7 is a schematic diagram of an apparatus for generating the desired DCT block of FIG. 5.

FIG. 7 is a schematic diagram of an apparatus for performing the required matrix computation within the motion compensator 110.

In FIG. 7, DCT blocks 90 from the decoder 40 are stored in a DCT frame store 160. The motion vector for the current output block 130 is used to compute a DCT block number, representing the block in which the upper left-hand corner of the area 140 is disposed (in FIG. 5b, this would identify the block 91), together with an x offset and a y offset in pixels between 0 and 7 (blocksize−1) pixels.

The block number, x offset and y offset are supplied to the DCT frame store, and the x offset and y offset values are supplied to a matrix generator 170.

In response to the block number, blocks of coefficients from the DCT frame store are supplied to four matrix multipliers 180. The four blocks 90 which are supplied to respective matrix multipliers 180 are: the block in which the upper left-hand corner of the area 140 is disposed, the block immediately to the right of that block, the block immediately underneath that block, and the block immediately diagonally underneath and to the right of that block. In other words, the four blocks of FIG. 5b which overlap the required area 140 are supplied to respective matrix multipliers 180.

The matrix generator 170 generates frequency-domain pre- and post-matrices which are supplied to respective matrix multipliers 180. These matrices are generated in accordance with the rules given in Appendix 1, followed by application of the DCT transform to the pixel domain matrices produced by Appendix 1. Alternatively, the matrix generator 170 could simply access a look-up table in which matrix coefficients (previously generated by the above techniques) are stored for each permutation of the x and y offsets.

Each matrix multiplier performs pre and post multiplication by the respective matrices and supplies a matrix output to a matrix adder of 190. This performs matrix addition of the four outputs of the matrix multipliers 180 to generate the required output block 130.

The question may arise that if the area 140 overlaps only one DCT block 90 held in the DCT framestore 160, there is no need for four matrix multiplications and a subsequent addition. This is true, but since the remaining three sets of pre- and post-matrices (for the adjacent but non-overlapped blocks) would have all zero coefficients using the rules of appendix 1, the matrix adder 190 would simply receive the required block 130 and three sets of zero matrices. It is therefore simpler not to distinguish the special case of a complete overlap of a single block 90, but to allow the matrix process to take care of this situation.

Although the embodiments described above have interchanged the order of motion compensation and DCT decoding but still produce output video from the DCT decoder, the techniques described above can be used for, application such as changing the GOP format of, for example, an MPEG-encoded video stream. For example, if it is desired to convert from a 12-frame GOP to a 2-frame GOP, some of the B or P frames of the 12-frame GOP must be converted to I frames, for some of the 2-frame GOPS. Since I frames do not make use of motion compensation with respect to other frames (they are intra-frame encoded), the motion compensation of the data must be "undone". Previously, this would have been performed by transforming back to this basal domain and re-encoding; however, using the techniques presented here, the process can be performed in the DCT domain.

Another use of the technique may be found in digital video effects as applied to DCT encoded data. If, for example, a picture is being cropped or expanded so that the new picture boundary does not line up with a DCT block boundary, then previously the DCT data would have had to have been decoded so that this manipulation is performed in the spatial (pixel) domain. Now, using the techniques described above, new DCT blocks at the new boundary of the image can be generated in the DCT domain, so there is no need for the decoding-recoding process.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

APPENDIX 1

This appendix describes the generation of pixel domain translation matrices. The corresponding frequency domain pre- and post-matrices are generated by applying a DCT transformation to the pixel domain matrices.

Considering first some definitions and statements which will assist in explanation of the rules, an identity matrix is a matrix in which all elements are zeroes except those elements on the leading diagonal. For example, a 2×2 identity matrix is:

$$\begin{pmatrix} 1 & 0 \\ 0 & 1 \end{pmatrix}$$

and a 3×3 identity matrix is:

$$\begin{pmatrix} 1 & 0 & 0 \\ 0 & 1 & 0 \\ 0 & 0 & 1 \end{pmatrix}$$

A block of K×K pixesl is treated as a K×K matrix of elements. It is first pre-multiplied by a pre-matrix and is then post-multiplied by a post-matrix. This process is illustrated below:

$$\begin{pmatrix} \text{required} \\ \text{block} \end{pmatrix} = \left( \begin{pmatrix} \text{pre-} \\ \text{matrix} \end{pmatrix} \cdot \begin{pmatrix} \text{orig.} \\ \text{block} \end{pmatrix} \right) \cdot \begin{pmatrix} \text{post-} \\ \text{matrix} \end{pmatrix}$$

A pre- or post-matrix in this context is a K×K square matrix which contains one identity sub-matrix of size 1×1, where 1 is less than K. All other elements of the pre- or post matrix are zeroes.

The rules for generating pre- and post-matrices are as follows:

1. Generate the non-zero elements of the post-matrix as an identity sub-matrix of size m×m, where m is equal to the number of columns in the required notional block that contain non-zero elements.
2. Generate the non-zero elements of the pre-matrix as an identity sub-matrix of size n×n, where n is equal to the number of rows in the required notional block that contain non-zero elements.
3. For the post-matrix, move identity sub-matrix down by x rows if it is required to move the columns of the notional block leftwards by x columns.
4. For the post-matrix, move identity sub-matrix right by x columns if it is required to move the columns of the notional block rightwards by x columns.

5. For the pre-matrix, move identity sub-matrix down by x rows if it is required to move the rows of the notional block down by x rows.

6. For the pre-matrix, move identity sub-matrix right by x columns if it is required to move the rows of the notional block up by x rows.

EXAMPLE 1

In this and the following example, 4×4 matrices (i.e. K=4) will be used for ease of explanation, even though in many DCT-based systems larger block sizes are commonly used. The principles remain the same, however, whatever the value of K.

The initial pixel block is therefore:

$$\begin{pmatrix} a & b & c & d \\ e & f & g & h \\ i & j & k & l \\ m & n & o & p \end{pmatrix} \quad (1)$$

and the final (desired) matrix is:

$$\begin{pmatrix} 0 & 0 & 0 & 0 \\ c & d & 0 & 0 \\ g & h & 0 & 0 \\ k & l & 0 & 0 \end{pmatrix} \quad (2)$$

The pre- and post matrices are determined as follows:

a) For the pre-matrix, the required identity sub-matrix is a 3×3 sub-matrix. It then has to move down by 1 row in order to move the rows of the initial matrix down by 1 row. The pre-matrix is therefore:

$$\begin{pmatrix} 0 & 0 & 0 & 0 \\ 1 & 0 & 0 & 0 \\ 0 & 1 & 0 & 0 \\ 0 & 0 & 1 & 0 \end{pmatrix}$$

b) For the post-matrix, the required identity sub-matrix is a 2×2 sub-matrix. It then has to move left by 2 columns in order to move the rows of the initial matrix down by 2 rows. The post-matrix is therefore:

$$\begin{pmatrix} 0 & 0 & 0 & 0 \\ 0 & 0 & 0 & 0 \\ 1 & 0 & 0 & 0 \\ 0 & 1 & 0 & 0 \end{pmatrix}$$

EXAMPLE 2

Starting with the same initial matrix, $$\begin{pmatrix} a & b & c & d \\ e & f & g & h \\ i & j & k & l \\ m & n & o & p \end{pmatrix}$$

and aiming for the final matrix $$\begin{pmatrix} 0 & 0 & e & f \\ 0 & 0 & i & j \\ 0 & 0 & m & n \\ 0 & 0 & 0 & 0 \end{pmatrix}$$

the required pre-matrix is $$\begin{pmatrix} 0 & 1 & 0 & 0 \\ 0 & 0 & 1 & 0 \\ 0 & 0 & 0 & 1 \\ 0 & 0 & 0 & 0 \end{pmatrix}$$

and the required post-matrix is $$\begin{pmatrix} 0 & 0 & 1 & 0 \\ 0 & 0 & 0 & 1 \\ 0 & 0 & 0 & 0 \\ 0 & 0 & 0 & 0 \end{pmatrix}$$

I claim:

1. A method of processing a number of input arrays of image spatial frequency coefficients being transformable to image pixel values by a predetermined spatial frequency transformation, said method comprising the steps of:

generating an output array of image spatial frequency coefficients from said number of input arrays;

detecting which of said number of input arrays contain portions overlapped by said generated output array;

generating at least one pixel domain translation matrix corresponding to each of said number of input arrays which contain portions overlapped by said generated output array;

matrix-multiplying each pixel domain translation matrix the corresponding input array subjected to the inverse of said predetermined spatial frequency transformation, so that said means for matrix-multiplying provides a translation of the respective overlapped portion to an overlapping position in said output array;

matrix-multiplying each of said number of input arrays by the respective one of the pixel domain translation matrices subjected to the inverse of said predetermined spatial frequency transformation; and matrix-adding the matrix-multiplied image spatial frequency coefficients generated from each of said number of input arrays;

means for outputting the results of said matrix-adding step.

2. A method according to claim 1, wherein said predetermined spatial frequency transformation is the inverse discrete cosine transform.

3. A method according to claim 1, wherein the step of detecting portions of said input arrays overlapped by said output array is in response to a motion vector associated with said output array.

4. A method according to claim 1, wherein the pixel domain matrices comprise a pre-multiplying matrix and a post-multiplying matrix.

5. Video signal processing apparatus for processing a number of input arrays of image spatial frequency coefficients being transformable to image pixel values by a predetermined spatial frequency transformation, said apparatus comprising:

means for generating an output array of image spatial frequency coefficients from said number of input arrays;

means for detecting which of said number of input arrays contain portions overlapped by said generated output array;

means for generating at least one pixel domain translation matrix corresponding to each of said number of input arrays which contain portions overlapped by said generated output array;

means for matrix-multiplying each pixel domain translation matrix the corresponding input array subjected to the inverse of said predetermined spatial frequency transformation, so that said means for matrix-multiplying provides a translation of the respective overlapped portion to an overlapping position in said output array;

means for matrix-multiplying each of said number of input arrays by the respective one of the pixel domain translation matrices subjected to the inverse of said predetermined spatial frequency transformation; and means for matrix-adding the matrix-multiplied image spatial frequency coefficients generated from each of said number of input arrays;

means for outputting the results of said matrix-adding means.

* * * * *